United States Patent
Dray

[15] 3,700,293
[45] Oct. 24, 1972

[54] PISTON TYPE THRUST BEARING

[72] Inventor: James F. Dray, Annapolis, Md.

[73] Assignee: The United States of America as represented by the Secretary of the Navy

[22] Filed: April 7, 1971

[21] Appl. No.: 132,015

[52] U.S. Cl. ..................................................308/9
[51] Int. Cl. ..............................................F16c 17/16
[58] Field of Search..........................308/9, 122, 160

[56] References Cited

UNITED STATES PATENTS 303,813   8/1884   Cousins........................308/9

Primary Examiner—Milton Kaufman
Assistant Examiner—Frank Susko
Attorney—R. S. Sciascia, Q. E. Hodges and J. W. Peterson

[57] ABSTRACT

The invention is a piston type thrust bearing wherein the rotating shaft has a radially extending plate attached thereto which defines a piston in a cylinder having fluid pressure acting axially on opposite sides of said piston to absorb thrust loads.

2 Claims, 1 Drawing Figure

Patented Oct. 24, 1972

3,700,293

INVENTOR
JAMES F. DRAY

BY  *Ju Peterson*  AGENT
  *J.C. Hodges* ATTORNEY

PISTON TYPE THRUST BEARING

The invention described herein may be manufactured and used by or for the Government of the United States of America for Governmental purposes without the payment of any royalties thereon or therefor.

BACKGROUND OF THE INVENTION

Currently ships employ as their main propulsion thrust bearing one of the following types: Kingsbury, Michell, tapered land, tapered roller, or spherical rollers. These types of bearings are large and are limited in their capacity. In addition, these types of bearings have a definite rated life due to mechanical wear. The present invention has the advantages that it is smaller in size, lower in weight and power loss than conventional thrust bearings. Although several control systems have been previously used to control the shaft position the present invention is believed to be the first combination of a piston, housing, hydraulic and servo control system designed to operate primarily as a main thrust bearing. This bearing provides precise position control over an unlimited period of time and is limited only in capacity by the supply pressure of the system.

SUMMARY OF THE INVENTION

The general purpose of this invention is to provide a piston type thrust bearing as a replacement for the more conventional type of sliding surface and rolling contact thrust bearings, and to provide a bearing which will be smaller and lower in weight for a specific load capacity and more precisely control shaft motion and position.

OBJECTS OF THE INVENTION

The principal object of the invention is to provide a piston type thrust bearing to replace the conventional sliding surface and rolling contact thrust bearings by providing a bearing which will be smaller and lower in weight for a specific load capacity than presently known thrust bearings.

It is a further object of the instant invention to provide a thrust bearing which precisely controls shaft motion and position.

Still another object of the invention is to provide a thrust bearing which can absorb or modify any alternating or dynamic thrust forces, such as those generated by the propeller of a ship or those absorbed by the impeller of a pump.

DESCRIPTION OF THE PREFERRED EMBODIMENT

Figure 1:
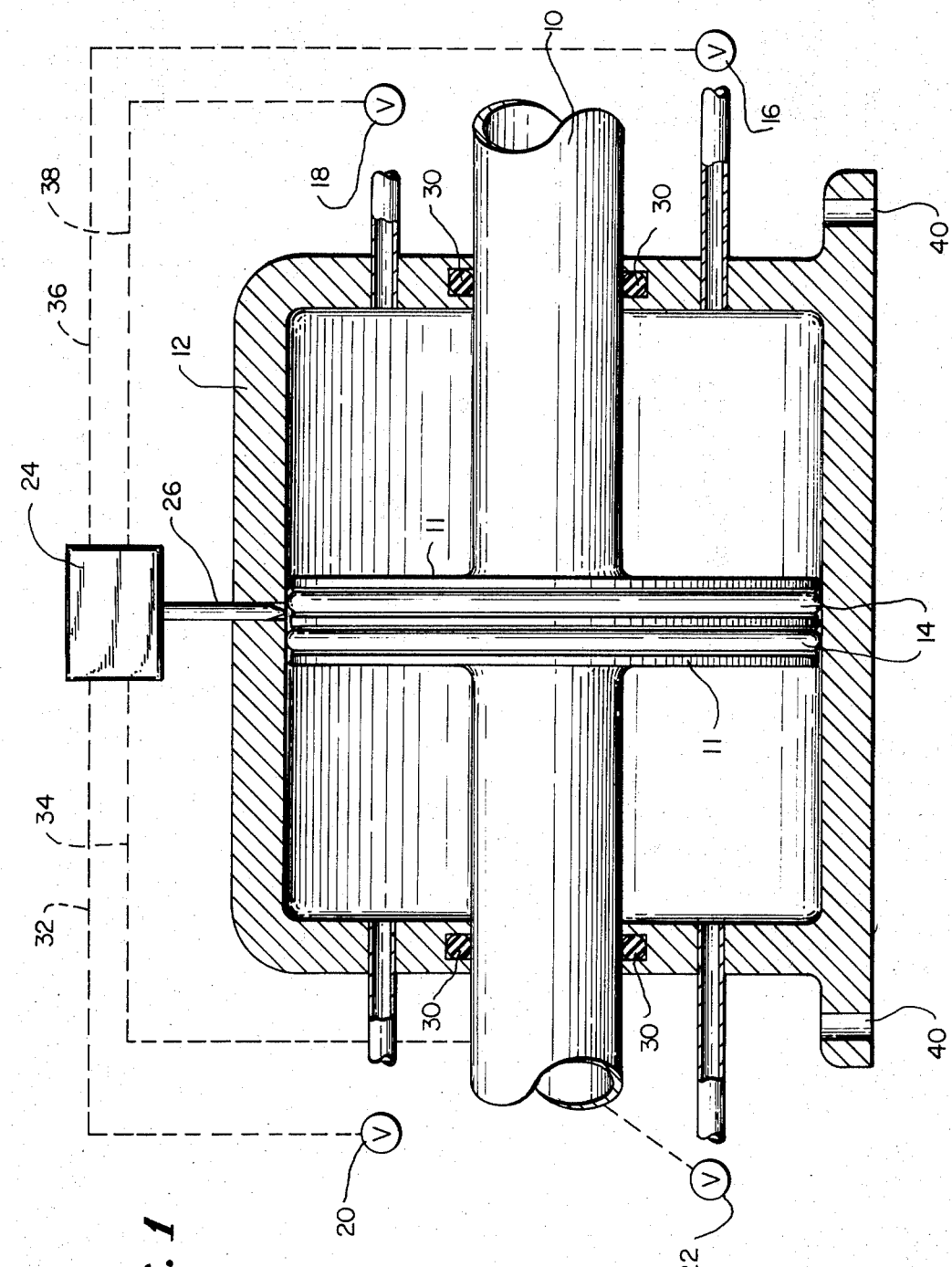
FIG. 1 is a side view of the thrust bearing with the thrust bearing housing in cross-section.

The thrust bearing consists of a housing 12, containing a rotating shaft 10, and a piston 11 having radial seals 14, shaft seals 30 at both ends of the housing and a piston or thrust collar position monitor 24 which actuates the fill and bleed line servo control valves 16, 18, 20 and 22. The housing 12, piston 11 and shaft 10 may be manufactured from any metallic material having sufficient structural strength for pressures involved such as cast or welded steel. The housing could also be manufactured with other metals having a lower weight than steel, such as bronze or aluminu. In addition, the housing may be designed to disassemble through plates at either end or by having the housing split at the horizontal center line. The seals 14 and 30 may be composed of any good sealing and wearing material such as carbon. The seals can be made of materials such as tungston carbide, hard cobalt base alloys; Buna N, Viton A or polyurethene synthetic rubbers; or plastic such as teflon or laminated phenolics. The thrust bearing carries the forward thrust load by transmitting the thrust from the shaft 10, through the piston 11, to a fixed volume of fluid ahead of the piston in the housing 12, at a pressure equal to the thrust load. As the forward thrust increases the fluid in the housing ahead of the piston causes the piston 11 to move forward. The piston motion is sensed by a microswitch or similar monitoring device 26, which transmits a signal via the thrust collar position monitor 24, to servo valve 18, which opens and admits more fluid from a source at a higher pressure until the piston 11 moves back to the midposition of the bearing end clearance. As the forward thrust load decreases the piston moves back in the housing 12, as the fluid ahead of the piston 11, expands as the pressure decreases. This motion is sensed by the microswitch 26 and the servo valve 16 opens and relieves the pressure until the piston 11 moves back to the clearance center. When the thrust load is in the reverse direction, the bearing functions in the same manner with the servo valves 20 and 22 replacing 18 and 16. For the normal steady state condition, the thrust load is constant, the rotational speed is constant, the volume of fluid is constant and the valves are closed.

The housing 12, may be mounted with conventional mounting flanges on the bottom through the use of apertures 40 or by using strut or diaphram mounting at the horizontal centerline. If the power loss due to fluid sheer is sufficiently high the fluid may be cooled by having cooling coils (not shown) within the housing or by pumping the fluid through the housing continuously and through an external cooler (not shown) to remove the heat. Any fluid can be used as a lubricant and actuation fluid, normally oil would be used but if a lower viscosity and therefore lower power loss is desired any fluid such as water may be used. A compressible fluid could be used to dampen some vibration before actuating the monitoring device if desired. The control system may use various sensors such as microswitches, strain gauges, or hydraulic pistons and the servo valves may be hydraulically, pneumatically or electrically actuated. The piping may be of any material which is compatable to the fluid used and the operating pressure. In addition, it would be within the scope of the invention for the housing to contain one or more journal bearings to align the piston to the cylinder housing. Support journal bearings may optionally be positioned outside the housing. Furthermore, secondary thrust bearings could be mounted in the forward and reverse end of the housing to provide thrust carrying capacity and in case of loss of primary fluid operating pressure.

It is understood that the invention is not limited to the exact details of construction shown and described for obvious modifications will occur to persons skilled in the art. It is therefore to be understood that within the scope of the appended claims the invention may be practiced otherwise than as specifically described.

What is claimed is:

1. A thrust bearing comprising:

a hollow housing;

a rotatably mounted shaft extending through opposite ends of said housing;

piston means concentrically mounted on and extending radially from said shaft and in sliding engagement with the inside wall of said housing, said piston means defining two chambers within said housing, one on each side of said piston means;

inlet and outlet valves connected to each of said chambers to control the flow of fluid under pressure into and out of said chambers, said fluid acting on said piston means to balance axial thrust of said shaft; and a microswitch contacting said piston means to sense the position of said piston means so that valves can be actuated to balance axial thrust.

2. A device as in claim 1, wherein said valves are electrically actuated servo valves.

* * * * *